(12) United States Patent
Tulett

(10) Patent No.: US 7,359,282 B2
(45) Date of Patent: Apr. 15, 2008

(54) METHODS AND APPARATUS OF SOURCE CONTROL FOR BOREHOLE SEISMIC

(75) Inventor: John Tulett, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 93 days.

(21) Appl. No.: 10/439,904

(22) Filed: May 16, 2003

(65) Prior Publication Data

US 2004/0228214 A1 Nov. 18, 2004

(51) Int. Cl.
*G01V 1/38* (2006.01)

(52) U.S. Cl. .......... 367/23; 367/15; 367/144; 181/110; 181/118

(58) Field of Classification Search .......... 367/15, 367/16, 23, 144; 181/110, 118
See application file for complete search history.

(56) References Cited

U.S. PATENT DOCUMENTS

| | | | |
|---|---|---|---|
| 4,210,897 A | | 7/1980 | Hutchins |
| 4,476,553 A | | 10/1984 | Ziolkowski et al. |
| 4,660,184 A | * | 4/1987 | Haukjem et al. ............. 367/16 |
| 4,721,180 A | | 1/1988 | Haughland |
| 4,757,482 A | | 7/1988 | Fiske, Jr. |
| H656 H | * | 7/1989 | Huizer et al. ................. 367/23 |
| 4,868,794 A | * | 9/1989 | Ziolkowski et al. .......... 367/23 |
| 4,894,807 A | * | 1/1990 | Alam et al. ................... 367/15 |
| 5,184,329 A | * | 2/1993 | Regnault et al. ............. 367/23 |
| 5,548,562 A | * | 8/1996 | Helgerud et al. ............. 367/14 |
| 5,581,415 A | | 12/1996 | de Graffenried |
| 5,995,905 A | | 11/1999 | Ikelle et al. |
| 6,026,056 A | * | 2/2000 | Lunde et al. ................. 367/23 |
| 6,044,038 A | * | 3/2000 | Allensworth ................. 367/16 |
| 6,091,668 A | * | 7/2000 | Barber, Sr. .................... 367/15 |
| 6,188,962 B1 | * | 2/2001 | Morgan et al. ............... 702/14 |
| 6,301,193 B1 | | 10/2001 | Martin et al. |
| 6,788,618 B2 | * | 9/2004 | Clayton et al. ............... 367/13 |
| 2003/0117893 A1 | * | 6/2003 | Bary ............................. 367/16 |

FOREIGN PATENT DOCUMENTS

| | | |
|---|---|---|
| EP | 0400769 | 12/1990 |
| FR | 2588968 | 10/1985 |
| GB | 2029016 A | 3/1980 |
| GB | 2172997 A | 10/1986 |
| GB | 2320327 A | 6/1998 |

(Continued)

OTHER PUBLICATIONS

Brice, Larsen, Morice, Svendsen, and Ozbek. "Perturbations in 4D Marine Seismic." Preview: Australian Society of Exploration Geophysicists, Feb. 1996.*

(Continued)

*Primary Examiner*—Jack W. Keith
*Assistant Examiner*—Scott A Hughes
(74) *Attorney, Agent, or Firm*—Matthias Abrell; Jaime Castano; Dale Gaudier

(57) ABSTRACT

A method and apparatus for controlling seismic sources. The method and apparatus enable firing of a seismic sources at either a precise time or a precise position of the seismic source. Controlling the firing of the seismic source facilitates more accurate seismic data and a more consistent seismic source signature.

69 Claims, 7 Drawing Sheets

FOREIGN PATENT DOCUMENTS

| | | |
|---|---|---|
| GB | 2379741 A | 3/2003 |
| JP | 11063984 | 5/1999 |
| WO | WO 01/71385 A1 | 9/2001 |
| WO | WO01/75481 A2 | 10/2001 |

OTHER PUBLICATIONS

J-F. Hopperstad, P. Vermeer, "An azimuth-invariant source array", SEG Int'l Exposition and Annual Meeting, San Antonio, Texas, Sep. 9-14, 2001.

* cited by examiner

METHODS AND APPARATUS OF SOURCE CONTROL FOR BOREHOLE SEISMIC

FIELD OF THE INVENTION

The present invention relates generally to methods and apparatus for exploring subsurface formations. More particularly, the present invention relates to methods and apparatus for controlling seismic sources.

BACKGROUND OF THE INVENTION

Subsurface formation analysis has enabled more efficient oil and gas recovery over the past several decades. In recent years, petroleum exploration has been occurring at increasingly deeper levels of water. As the water levels increase and the wells drilled lengthen, the subsurface formations often become more complex. To facilitate more efficient petroleum recovery, it is often desirable to generate a vertical seismic profile.

A vertical seismic profile (VSP) is a class of borehole seismic measurements used for correlation between surface seismic receivers and wireline logging data. VSPs can be used to tie surface seismic data to well data, providing a useful tie to measured depths. Typically VSPs yield higher resolution data than surface seismic profiles provide. VSPs enable converting seismic data to zero-phase data as well as enable distinguishing primary reflections from multiples. In addition, a VSP is often used for analysis of portions of a formation ahead of the drill bit.

Narrowly defined, VSP refers to measurements made in a vertical wellbore using acoustic receivers inside the wellbore and a seismic source at the surface near the well. In a more general context as used herein, however, VSPs vary in well configuration, the number and location of sources and acoustic receivers, and how they are deployed. Nevertheless, VSP does connote the deployment of at least some receivers in the wellbore. Most VSPs use a surface seismic source, which is commonly a vibrator on land, or an air gun in marine environments.

There are various VSP configurations including zero-offset VSP, offset VSP, walkaway VSP, vertical incidence VSP, salt-proximity VSP, multi-offset VSP, and drill-noise or seismic-while-drilling VSP. Check-shot surveys are similar to VSP in that acoustic receivers are placed in the borehole and a surface source is used to generate an acoustic signal. However, a VSP is a more detailed than a check-shot survey. The VSP receivers are typically more closely spaced than those in a check-shot survey; check-shot surveys may include measurement intervals hundreds of meters apart. Further, a VSP uses the reflected energy contained in the recorded trace at each receiver position as well as the first direct path from source to receiver while the check-shot survey uses only the direct path travel time.

While VSPs can provide valuable information about a formation, source perturbations (e.g. shot to shot variations in the seismic signature of an air gun) introduce error into the raw seismic data which percolates through the processing chain to the final images produced. VSP source perturbations can limit the full range of usefulness that VSPs data can provide. In marine surface seismic acquisitions, these source perturbations can be well controlled through digital gun controllers and processes such as source signal estimation (see, for example, U.S. Pat. Nos. 4,757,482; 5,581,415; 5,995,905; and 4,476,553, which are hereby incorporated by reference).

However, in VSP acquisitions, particularly marine VSPs, there is currently no standard gun controller to limit error introduced by source perturbations. This lack of control is problematic, because the shot to shot variations in the source wavelet are often significant. These errors are caused by variations in the timing and firing pressure, which can be pronounced. In rough seas, elevation changes can also cause errors. Some have added an uncalibrated hydrophone near the source (usually located a few meters from the source) to provide partial information useful for correcting time break errors (errors attributable to time differences for high waves, irregular source firings, etc.). Nevertheless, the partial information from the added hydrophone is not sufficient for a full shot deconvolution because of the proximity of the source, and in practice, such hydrophones are arbitrarily placed in relation to the source and do not record with sufficient signal fidelity to be useful. As a result, only gross errors in VSP source data are currently corrected. Therefore, sophisticated seismic data processing methods may not be used because current methods do not provide VSP seismic source information with the precision necessary to make sophisticated processing meaningful.

SUMMARY OF THE INVENTION

The present invention meets the above-described needs and others. Specifically, the present invention provides a source control system including a seismic source, a handling system, an umbilical, and an in-sea source controller for controlling the firing of the seismic source, where the seismic source generates seismic waves received by borehole receivers. The system may also include a float attached above the seismic source and in-sea source controller, with a motion sensor such as a global position system (GPS) unit mounted to the float. The motion sensor detects changes in height due to waves or variations in tide. The system may further include a switch controllable by the in-sea source controller to trigger firing of the seismic source at a predetermined wave height. According to some aspects, the seismic source is an air-gun array. The system may also include one or more in-sea sensors having a fixed geometry relative to the seismic source. The one or more in-sea sensors may include a calibrated hydrophone, a depth sensor, and/or a firing pressure sensor. The calibrated hydrophone measures pressure signals at the seismic source for relay to a processor. In one embodiment, analog signals transmitted from the seismic source are digitized by the in-sea controller for subsequent relay to the processor. Accordingly the system may include relatively short analog communication lines extending between the seismic source and the in-sea controller, with all remaining communication lines being digital. The umbilical may include digital communication lines, but no analog communication lines.

Another aspect of the invention provides a survey system including a plurality of receivers deployed in a borehole, a seismic source at a sea surface, a handling system, an umbilical, and an in-sea source controller for controlling the firing of the seismic source. The system may include a GPS unit operatively connected to the in-sea source controller and mounted to a float supporting the seismic source and in-sea source controller. The GPS unit receives Universal Time Coordinated (UTC), by which recording of the plurality of receivers and firing of the seismic source are synchronized. The system may further include a plurality of in-sea sensors such as a calibrated hydrophone, a depth sensor, and a pressure sensor. According to some aspects, the seismic source is an air-gun array. The air-gun array may be horizontally staggered. In some aspects, the umbilical includes digital communication lines as well as an air supply. The system may also include a float, where the float includes a motion sensor for detecting changes in height due to waves or variations in tide. The system may include a switch controlled by the in-sea source controller to trigger firing of the seismic source at a predetermined waver height by taking into account data from the motion sensor. According to some aspects of the system, the handling system includes a crane.

Another aspect of the invention provides a method of using a source control system including integrating firing of a seismic source with a navigation system to fire the seismic source at either a precise time or precise position of the source. The method may also include automatically tuning a seismic source, measuring a seismic source pressure wave directly at the seismic source, and measuring a seismic source depth in water directly at the source. The synchronizing of the source firing and downhole seismic receiver recording may be facilitated by a GPS system, and surface seismic receiver recording may also be synchronized with the source firing and downhole seismic receiver recording. The method may also include combining statistical quality control analysis of the surface source performance with borehole receiver performance and correcting for source signature variations. The correcting may include calibrating a near field sensor signal based on fixed geometry between the seismic source and a local sensor, reconstructing the far field signature of the seismic source from a measured near field signature, and maintaining a true amplitude for surface seismic calibrations, AVO surveys, and time lapse surveys.

Another aspect of the invention provides a method of improving a VSP survey including automatically tuning a seismic source, measuring a seismic source pressure directly at the seismic source, measuring a seismic source depth in water directly at the source, integrating firing of the seismic source with a navigation system to fire the seismic source at either a precise time or precise position of the source; synchronizing seismic source firing, downhole seismic receiver recording, and surface seismic receiver recording with UTC time; combining statistical quality control analysis of surface source performance with downhole receiver performance, and correcting for source signature variations. The correcting may include calibrating a near field sensor signal based on fixed geometry between the seismic source and a local sensor. The correcting may further include reconstructing a far field signature of the seismic source from measured near field signature. The method may also include comparing measured source signatures to a reference source signature, where the reference source signature is based on a seismic source reference far field signature on file at a well site. Further, the method may include integrating seismic source firing at a precise position of the source by taking vertical GPS measurements. In addition, the method may include comparing the seismic source depth measurement with a predetermined level and may include disabling the firing of the seismic source if the depth measurement is less than the predetermined level.

Another aspect of the invention provides a source control system including a seismic source, a handling system, an umbilical, an in-sea source controller for controlling the firing of the seismic source, and a bathymetry sensor for making tidal corrections. The seismic source generates seismic waves received by borehole receivers, and the system may include a GPS time synchronization unit.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Figure 1:
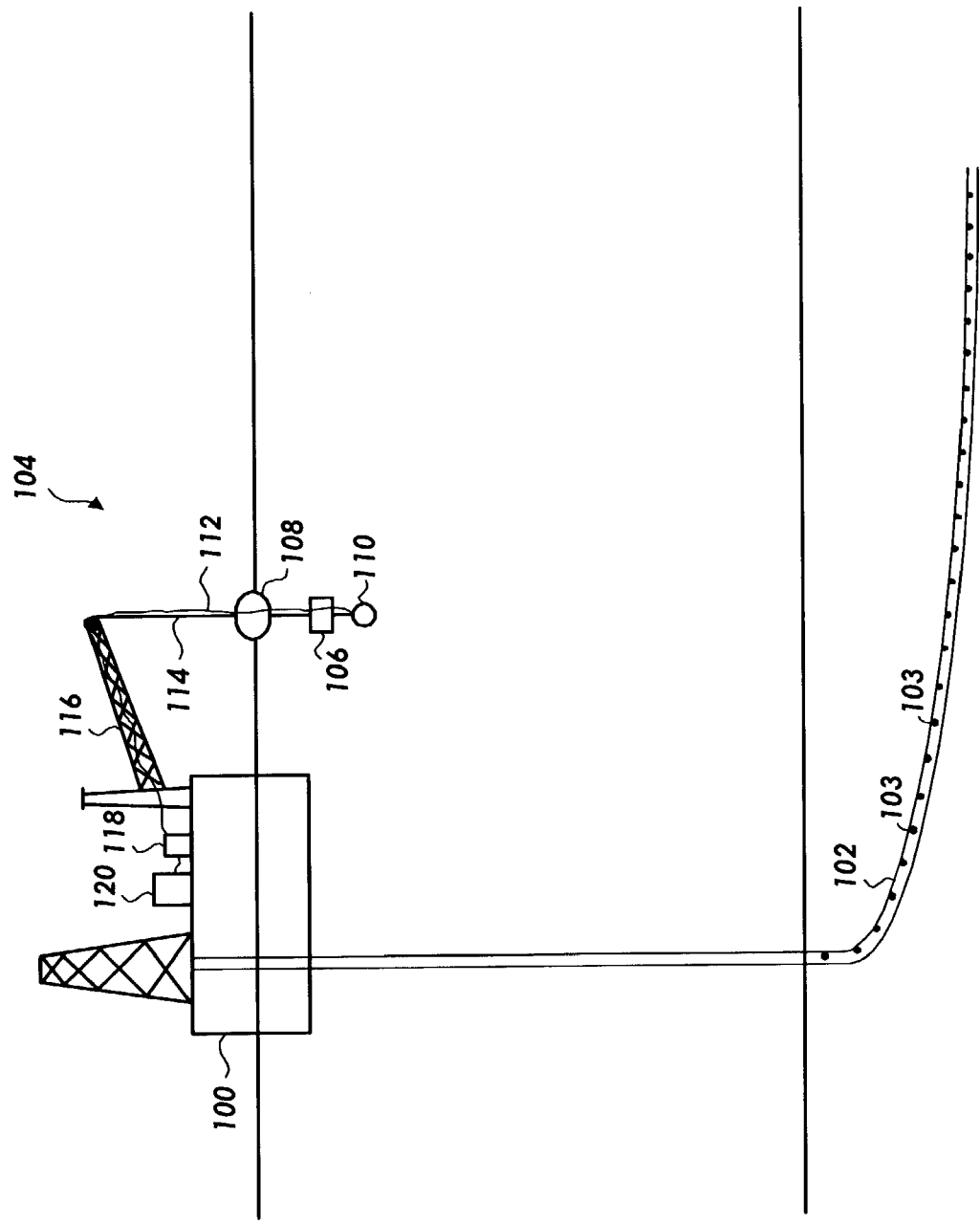
FIG. 1 is a simplified view of an offshore rig positioned over a borehole containing a plurality of receivers. The rig is shown supporting a conventional seismic survey apparatus.

Throughout the drawings, identical reference numbers indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE PREFERRED EMBODIMENTS

Illustrative embodiments and aspects of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates methods and apparatus for use in vertical seismic profile (VSP) and other borehole seismic surveys. The principles described herein facilitate generation of more accurate seismic source information than previously possible, adding precision to seismic data to enable sophisticated seismic data processing. The methods and apparatus of the present invention are preferably implemented to correct or compensate for variations in marine conditions, and/or provide for synchronization between source firing, downhole seismic receiver recording, and (optionally) surface seismic receiver recording. However, while the methods and apparatus are shown in marine implementations, they may also be used for land applications.

The methods and apparatus facilitate better seismic data analysis by more accurately providing source signatures. More accurate source signatures are a result of a source control system described below which may, for example, vary seismic source firing to coincide with a predetermined wave height for every shot in a marine application. Sea swells and tidal variations can introduce noise to seismic data and render it difficult or impossible to estimate the source signature. For example, sea swells of 3 m can lead to a 2 ms time displacement due to the potential differences in vertical displacement of a buoyed source. Larger swells can have an even more significant effect. For example, when shots are stacked during a rig-side VSP or an offset VSP, the change in travel time for each shot results in smearing of the seismic signals received during stacking and a loss of high frequencies. In fact, because of the noise that can be created by rough seas, marine surveys have previously been limited to conditions when sea swells are something less than approximately 3 to 4 m.

Turning now to the figures, and in particular to FIG. 1, a simplified view of an offshore rig (100) positioned over a subsea borehole (102) is shown. The borehole (102) contains a plurality of spaced receivers (103) to facilitate, for example, a vertical seismic profile (VSP) acquisition. The rig (100) is shown supporting a conventional seismic survey apparatus designated generally as (104). The survey apparatus (104) includes an air-gun or guns (106) suspended below the surface by a float (108). An analog hydrophone (110) is suspended below the air-gun (106). As discussed above, the hydrophone (110) can provide partial information for correcting time break errors (errors attributable to time differences for swells, irregular source firings, etc.) but not enough information for shot deconvolution. The hydrophone (110) of the typical survey apparatus (104) is not automatically calibrated and therefore dependent on the user, which often changes.

One or more analog lines (112) form part of an umbilical (114) that may also include an air line. The analog lines (112) traverse a handling system, such as a crane (116). The analog lines (112) provide an analog communications/control link between the guns (106), the hydrophone (110), a gun controller (118), and a computer processor (120). The gun controller (118) is arranged on the rig (100), far removed from the guns (106). Currently the lack of a display at the gun controller (118) or the computer processor (120) of the hydrophone readings or the air gun depth or pressure at the gun creates operational shortcomings. In addition, disconnection of the analog lines (112) while the air gun is powered can result in inadvertent firing of the air-gun (106) that may pose a safety hazard.

Therefore, according to the conventional arrangement of FIG. 1, seismic data quality is compromised. The position (referring primarily to depth) of the guns (106) is dependant on rig movement, waves, crane operation, and/or other factors. Prior to the teachings described herein, there has been no compensation or correction for changes in depth, no compensation for changes in air pressure, very limited ability to time the firing of the guns (106), and therefore the source signature of the guns (106) and the wave amplitude are far from optimal.

Figure 2:
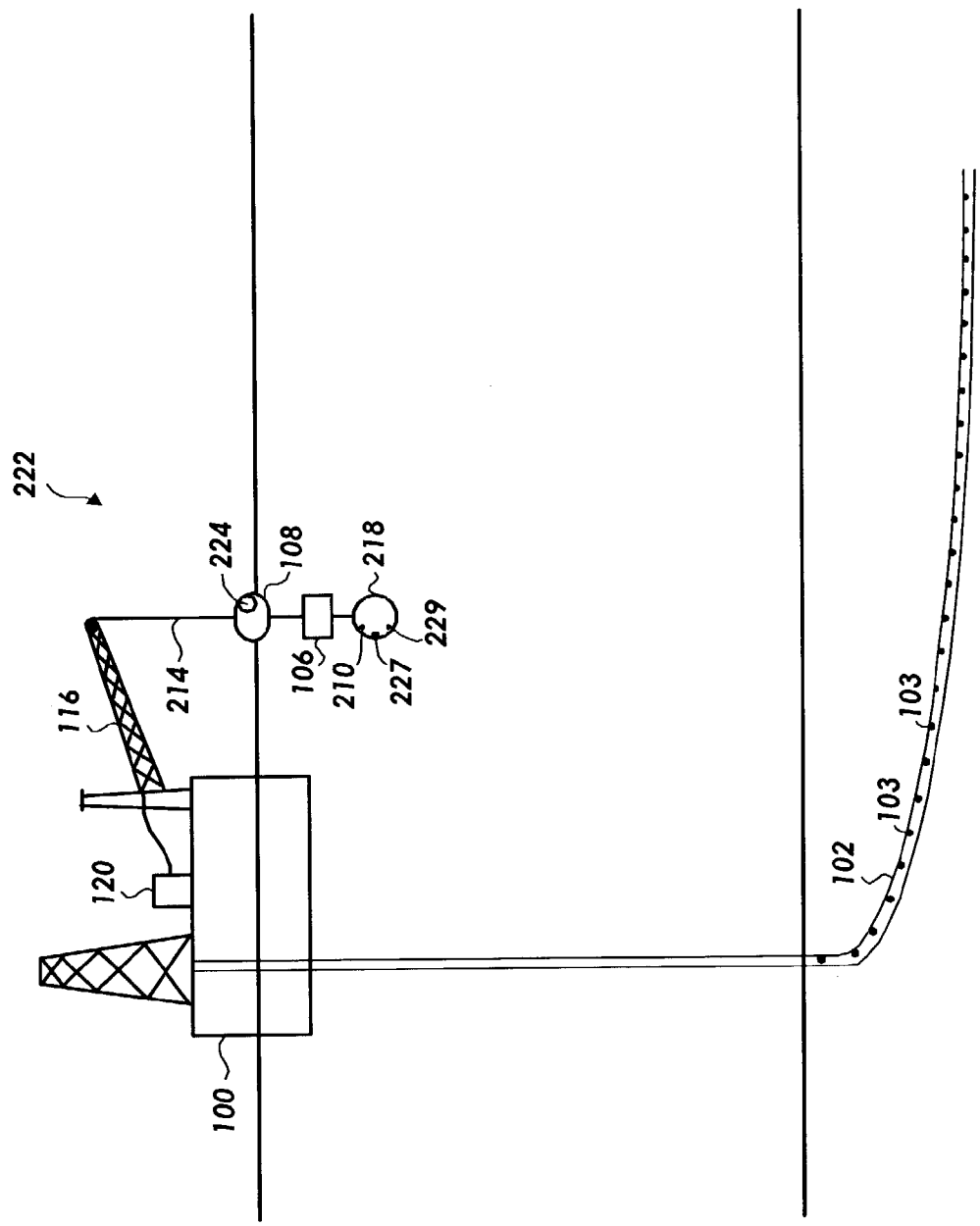
FIG. 2 is a simplified view of an offshore rig positioned over a borehole containing a plurality of receivers. The rig is shown supporting a seismic survey apparatus with a source control system according to one aspect of the present invention.

However, a source control system according to one aspect of the invention illustrated in FIG. 2 facilitates much more accurate seismic data. According to the arrangement of the FIG. 2, there is also an offshore rig (100) positioned over a subsea borehole (102) containing a plurality of receivers (103). The rig (100) is shown supporting the source control system and designated generally as (222). The rig (100) may be replaced, according to some embodiments, with a movable vessel. The source control system (222) includes a seismic source, a handling system, an umbilical (214), and an in-sea source controller (218) for controlling the firing of the seismic source. The source control system (222) and the borehole receivers (103) may be integrated to provide a borehole survey system.

According to the embodiment of FIG. 2 the seismic source is the air-gun (106), which may be a single gun, an array of guns, or any other arrangement. The handling system includes a crane (116) and associated apparatus to facilitate the deployment and retrieval of the source control system (222) and air gun (106). The umbilical (214) includes an air supply, which is operatively connected to a compressor. The compressor is preferably located on the rig (100). However, unlike the typical survey apparatus with long analog communication lines, the umbilical (214) of the source control system (222) according to FIG. 2 includes only digital communication lines between the in-sea source controller (218) and the processor (120) on the rig (100). The use of digital lines eliminates any crosstalk, signal leakage, and the potential for an inadvertent gun firing upon removal of the communication links. As mentioned above, the air gun (106) is controlled by the in-sea controller (218) and generates seismic waves that are received by the borehole receivers (103) to generate, for example, a VSP survey.

The source control system (222) may also include an attached float (108) to buoy the air gun (106), the in-sea controller (218), and any other in-sea apparatus. The float (108) may advantageously include a navigational system or motion sensor, such as a Global Positioning System (224) (GPS). GPS systems are readily available from a variety of sources. The GPS system (224), among other things, facilitates detection of changes in vertical height (due, for example, to waves or changes in tide). As mentioned above, firing the air guns (106) at different wave heights can adversely affect the determination of the source signature of the air gun (106) and/or other data collected by the borehole receivers (103). Accordingly, the GPS system (224) feeds position information to the processor (120) and/or the in-sea source controller (218) so that the air-gun (106) may be fired only at certain heights. The firing of the air gun (106) at certain heights may be controlled by a switch or other mechanism associated with the GPS system (224) or the in-sea controller (218), such that the air-gun is automatically fired at a certain, predetermined wave height. Conventional marine surveys fire air-guns at regular time intervals, regardless of height. The addition of a motion sensor according to principles described herein increases the accuracy of the source signature determination, discussed in more detail below.

In addition to providing position information, the GPS system (224) may also receive and broadcast a time standard to the in-sea controller (218), the processor (120), and/or any navigation subsystems that may be used with source control system (222). This time standard may, for example, be Universal Time Coordinated (UTC). The UTC time standard may be supplied to various survey subsystems to synchronize the firing of the air guns (106) with the recording of data by the borehole receivers (103). According to some embodiments, there may also be surface receivers, the recording of which may also be synchronized with air gun (106) firing using the time standard provided by the GPS system (224).

Further, according to some embodiments, the in-sea source controller (218) may include one or more in-sea sensors providing signals to enable, among other things, source signature estimation. Preferably, the in-sea sensors are located at the in-sea source controller (218) and maintain a fixed geometry relative to the air gun (106) or other seismic source. The one or more in-sea sensors may include, but are not limited to: a calibrated digital hydrophone (210), a depth sensor (227), and an air pressure sensor (229). The one or more in-sea sensors may also include short analog communication lines to the in-sea source controller (218), where the signals may be digitized at the source for relay to the processor (120). Therefore, according to the embodiment of FIG. 2, if the source control system (222) includes analog lines, those lines are relatively short, instead of the very long analog lines found in previous survey systems that extend all the way from the seismic source to the rig. The hydrophone (210) according to the present invention provides improved fidelity of a near field signal because it is calibrated in-sea and digitized at the seismic source. In addition, the air pressure sensor (229) monitors air pressure supply at the air-gun source and reports firing pressure variations which can be taken into account when determining the source signature. Accordingly, the seismic source signature may be more accurately estimated by accounting for timing variations, hydrodynamic variations, pressure supply variations, etc., using the calibrated digital hydrophone (210) signal and air pressure readings at the seismic source.

Estimation of an accurate source signal is highly important to VSP processing. The source signal enables separation of the upgoing and downgoing wavefields. Inconsistent source signatures result in residuals in collected data by the multi-channel velocity filters used to separate wavefields. These residuals are effectively "noise" and can cause significant distortion to the processed results. With an ever-increasing focus on true amplitude and time-lapse borehole seismic measurements, source signature consistency is very important to VSP surveys. Good source signature estimation using the methods and apparatus taught herein increase the consistency of the source signature.

Calibrating the source signatures has in the past been accomplished by visual quality checks. These visual checks include, for example, looking for air guns that did not fire and ensuring the frequency response covers both low and high ends. Such checks are somewhat subjective, however, and even more so if the air-gun (106) reference far field source signature is unknown. According to the present embodiment having the in-sea source controller (218), however, the air-gun (106) source reference far field signatures are on file at the well site, so the source control system (222) can be programmed to automatically check the measured source signature against the reference source signature. By performing an automatic check, there is an assurance that for each well site setup the air-gun (106) source signature meets its performance acceptance criteria. Calibrated and consistent source signatures are important for evaluating the subsurface changes in time-lapse surveys. With a calibrated source signature, variations in seismic reflections will be representative of subsurface changes, instead of changes in the source signature.

Seismic sources signatures for VSP must be surface referenced, and if there is a change in datum level (e.g. as the air-gun (106) rises and falls in a rough sea), there will be small 1 or 2 ms time shifts. However, the changes in datum level may be eliminated or compensated for by using the GPS system (224) or other motion sensing equipment. Further, heretofore tidal corrections have not been made for borehole seismic measurements. While failing to make tidal corrections may be acceptable for deep-water surveys, depending on the time of day and the strength of the tide, there may be a significant affect on transit times in coastal areas. Therefore, according to some embodiments the source control system (222) includes a depth sensor (227) to monitor the depth of the air gun (106) below the water surface. The depth sensor (227) may be, for example, a commercially available bathymetry sensor. Variations in tide may then also be accounted for according to principles described herein. In addition, the air-gun (106) may be automatically disabled if the depth sensor (227) reports a depth less than a predetermined level. The attributes reported by the in-sea sensors may be automatically displayed at the processor (120) for a user to see.

The configuration of the air-gun (106) may be a cluster arrangement, such as a three-gun cluster. However, any other air-gun arrangement may also be used. For example, some embodiments may include air-gun clusters of up to eight guns or more. Prior methods are restricted to simultaneous firing of air guns. The digital in-sea controller (218) in the present invention provides the capability to stagger the firing of an array of air guns (106), which has previously been unavailable using rig-based analog controllers that lack the tuning flexibility to fire sequentially.

Figure 3:
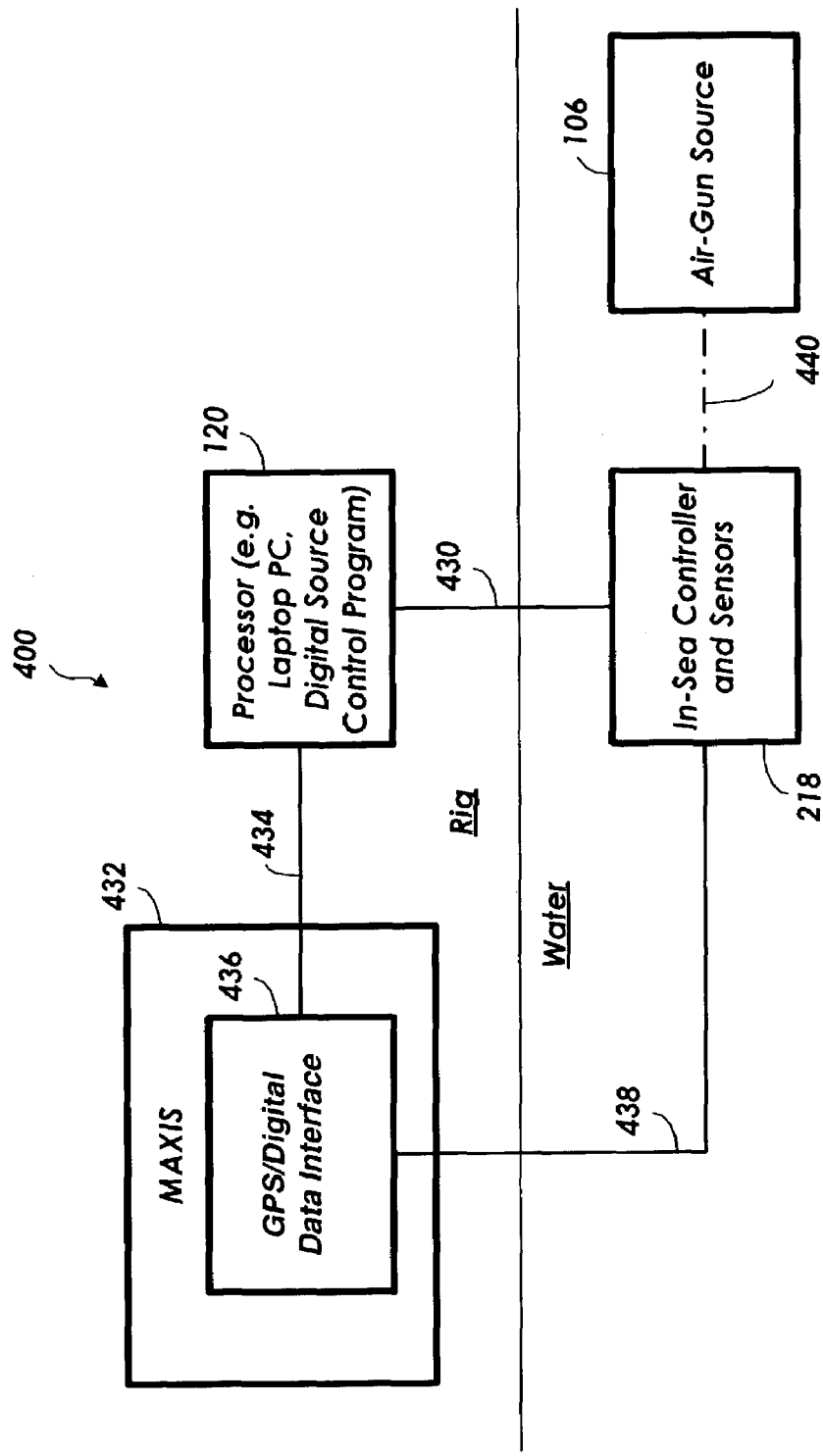
FIG. 3 is a schematic diagram illustrating a source control system according to one aspect of the present invention.

Referring next to FIG. 3, a schematic illustration of one possible source control system (400) configuration according to aspects of the present invention is shown. As shown in FIG. 3, the processor (120) may be a laptop computer running a digital source control program. The processor (120) may control and/or monitor the in-sea controller and sensors (218) described above with reference to FIG. 2, which may also include the GPS system (224, FIG. 2). The communication interface between the processor (120) and the in-sea controller (218) and sensors (227, 229) is preferably a digital link (430). This digital link (430) may be used for pre-testing the system in preparation for data acquisition. The processor (120) may also link with an acquisition and imaging system (432), for example Schlumberger's MAXIS™ (Multitask Acquisition and Imaging System) system via another digital interface (434). The acquisition and imaging system (432) may include a GPS digital data interface (436) as shown. Alternatively, the processor (120) may contain a GPS digital data interface (436). The processor (120) and acquisition and imaging system (432) are located on the rig according to the illustration of FIG. 3, however, as the name suggests, the in-sea controller and sensors (218) are located in the water adjacent the air-gun (106) or other seismic source. The in-sea controller and sensors (218) may also have a digital interface (438) with the acquisition and imaging system (432). This direct digital interface (438) may provide the primary interface with the acquisition and imaging system (432) during data acquisition. The only analog interface (440) of the source control system (400) extends the short distance between the in-sea controller and sensors (218) and the air-gun source (106).

Figure 4:
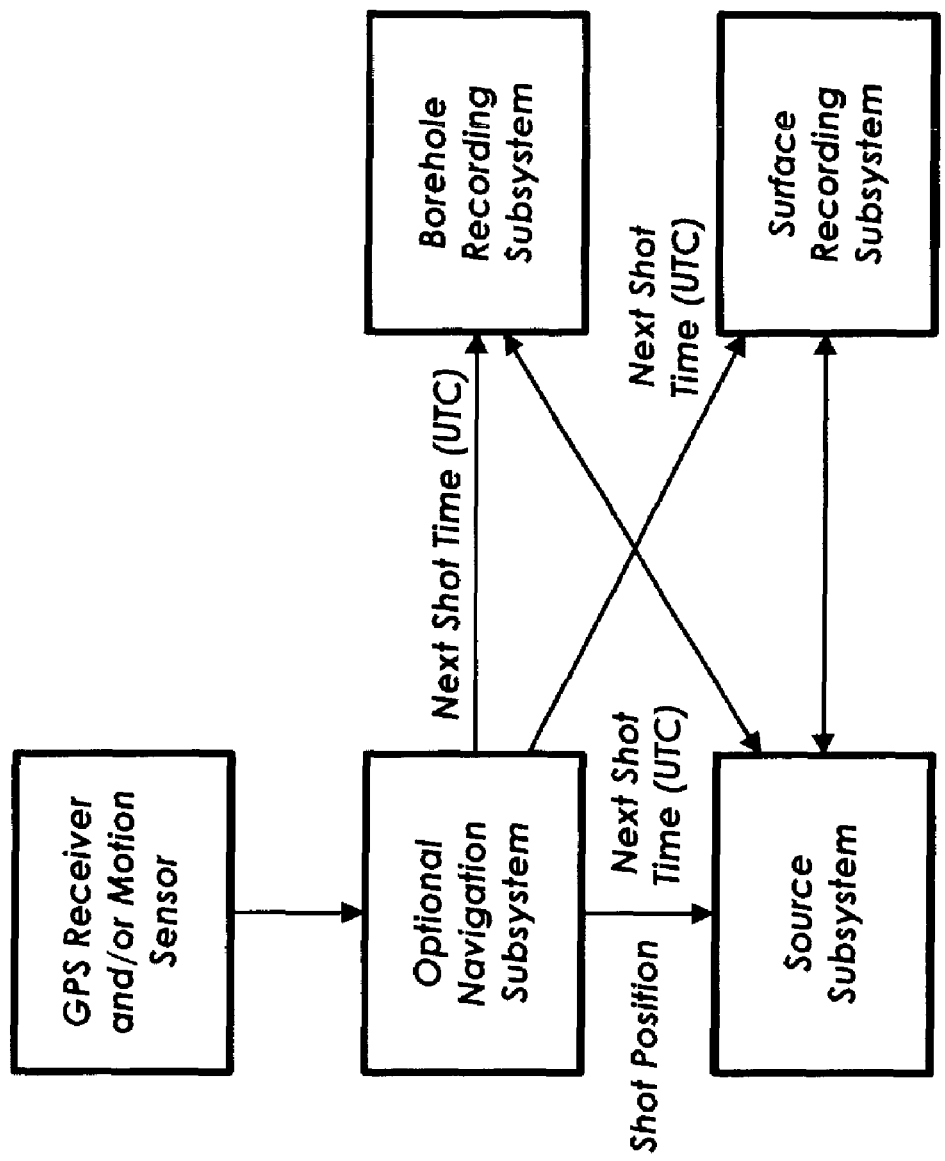
FIG. 4 is a schematic illustration of a source control method according to one aspect of the present invention.
Figure 5:
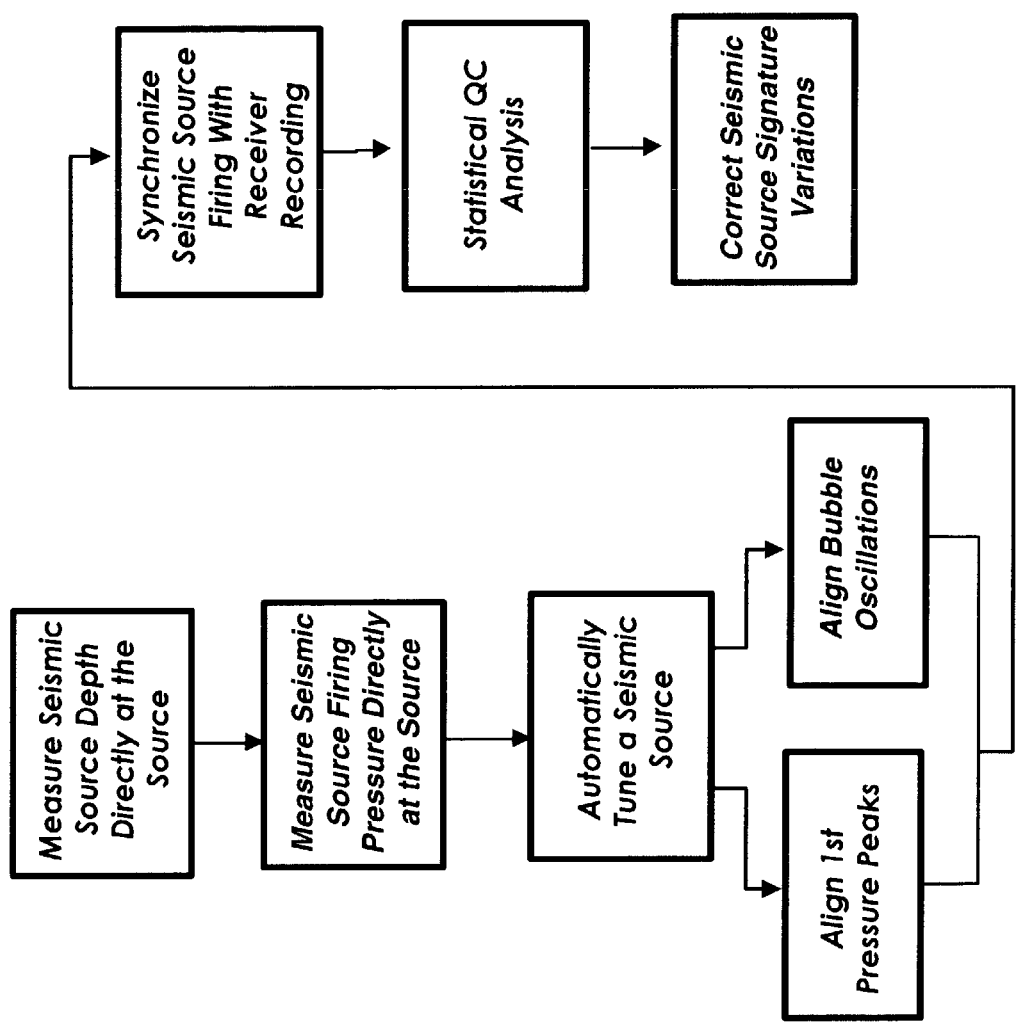
FIG. 5 is a schematic illustration of a source control method according to another aspect of the present invention.
Figure 6:
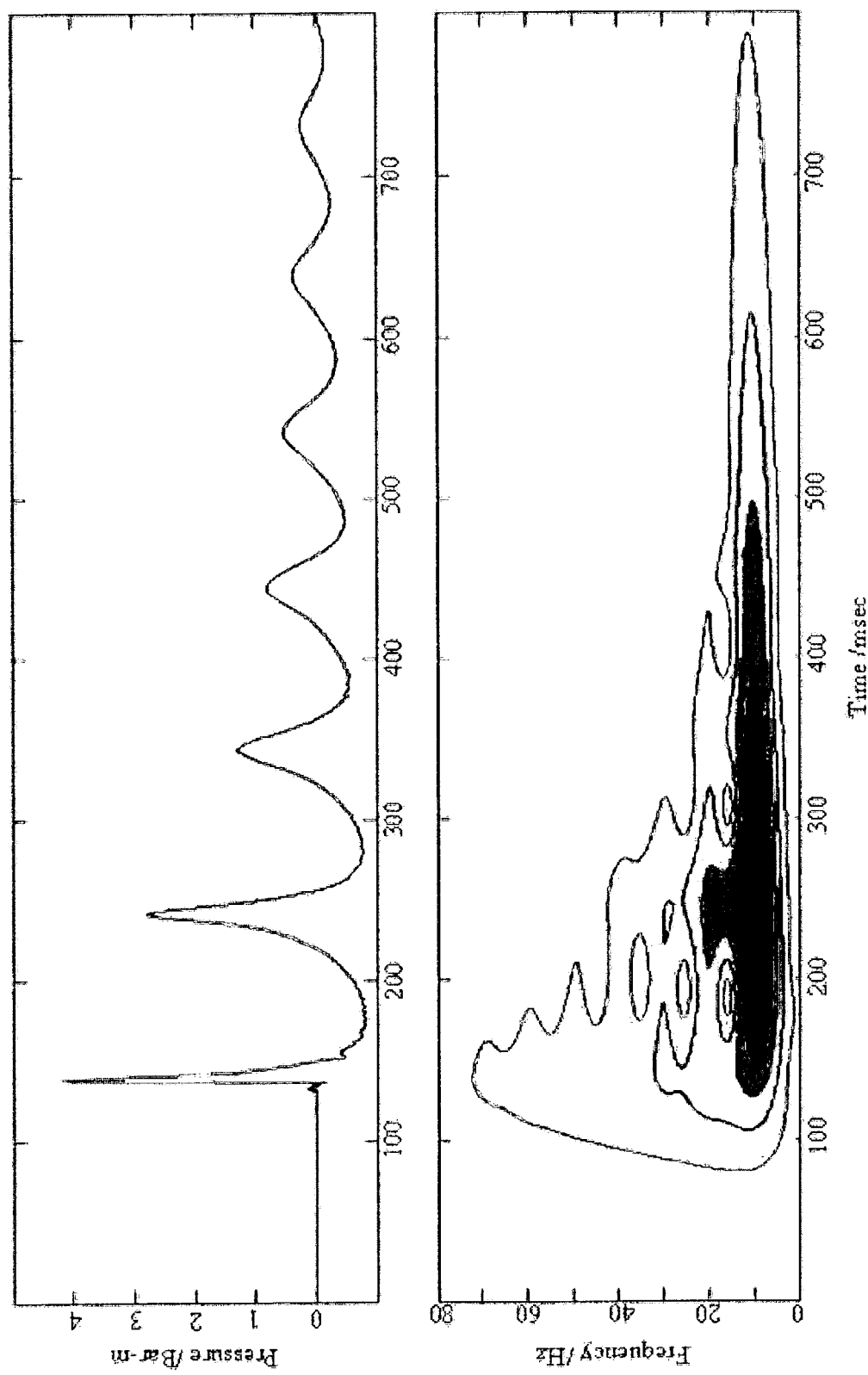
FIG. 6 is a single, near field air gun signature with pressure and frequency shown as a function of time.

Turning next to FIGS. 4-5 schematic illustrations representing methods of using the source control system (222) and/or improving a VSP survey are shown. It will be understood, however, that the methods shown and described are not limited to the particular sequences shown, nor must all the steps described be performed. The steps described may be accomplished in any of a number of sequences. According to one method, a seismic source such as an air-gun cluster (FIG. 2) is automatically tuned, for example, by the in-sea source controller (218). The in-sea source controller (218) may keep individual air-guns (106, FIGS. 2-3) firing in synchronization with one another by aligning first pressure peaks detected by the hydrophone (210, FIG. 2) located adjacent the air-guns (106, FIGS. 2-3). However, an air-gun's first pressure peak is dominant at high frequencies, which may not represent what is actually measured in deep attenuative formations. A bubble peak, on the other hand, occurs after the first pressure peak, is much lower in frequency content, and propagates down into deep attenuative formations. FIG. 6 illustrates a single, near-field gun signature, with no ghost. As shown, low frequency energy is centered upon a first bubble oscillation.

Figure 7B:
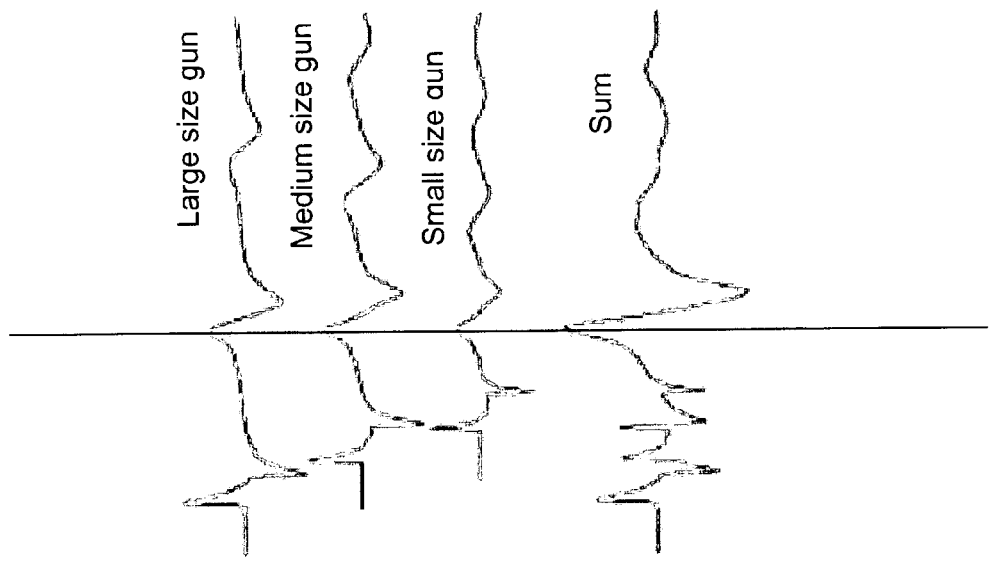
FIG. 7B is an illustration of air gun bubble oscillation tuning according to another aspect of the present invention.
Figure 7A:
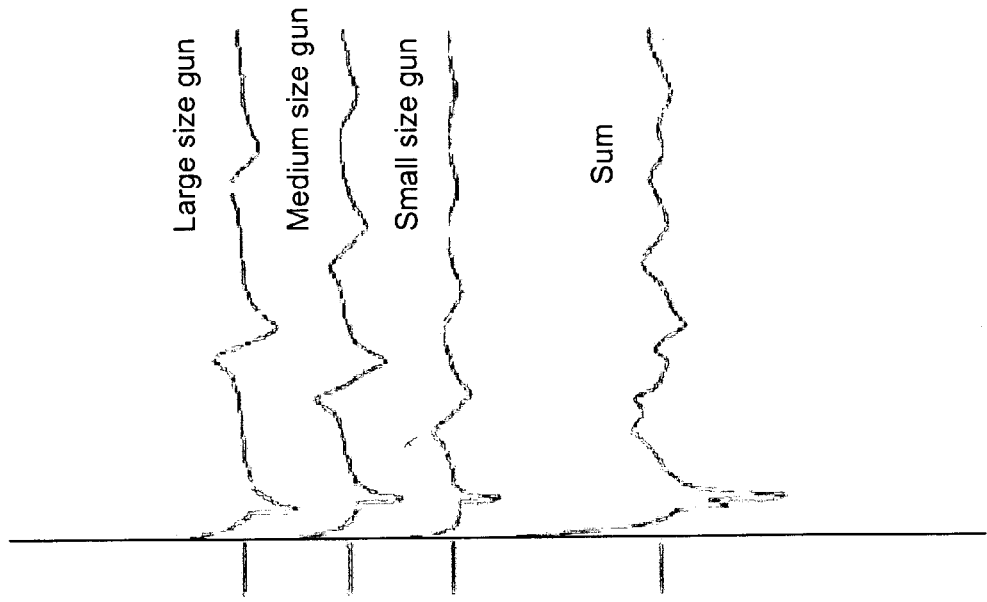
FIG. 7A is an illustration of air gun peak tuning according to one aspect of the present invention.

Therefore, according to some embodiments, the in-sea source controller (218) may tune or synchronize individual air-guns (218) with one another by aligning the high frequency pressure peaks, by aligning low frequency bubble oscillations, or by other methods. FIGS. 7A and 7B illustrate aligning high frequency pressure peaks, and low frequency bubble oscillations, respectively, of guns of different sizes. As shown, the bubble wavelets of FIG. 7B have a better peak-to-peak amplitude, are more compact, and are generally easier to identify and pick. Accordingly, tuning on the bubble oscillations is more efficient if low-frequency energy is required.

The methods of using the source control system (222, FIG. 2) or improving a VSP survey further include measuring the air-gun (106, FIG. 2) pressure directly at the source. The measurement of air-gun (106, FIG. 2) pressure may be facilitated, for example, by the pressure sensor (229, FIG. 2) of the in-sea sensor arrangement described above with reference to FIG. 2. The depth of the air-gun (106, FIG. 2) is also measured directly by the source. The measurement of air-gun (106, FIG. 2) depth may be facilitated, for example, by a bathymetry sensor or other depth sensor (227, FIG. 2) as described above. The methods also include integrating a firing of the air-gun (106, FIG. 2) with a navigation system to facilitate air-gun (106, FIG. 2) firing at either a precise time or a precise predetermined position, or both. The advantages of firing the air-gun (106, FIG. 2) or other seismic source only at precise positions are described above.

The navigation system for facilitating air-gun (106, FIG. 2) firing at certain vertical positions may be, for example, the GPS system (224, FIG. 2) discussed with reference to FIG. 2, which receives and broadcasts precise position data. The GPS system (224, FIG. 2) may also receive and broadcast a time standard such as UTC. Accordingly, the air-gun (106, FIG. 2) may be controlled according to time and position information received from the GPS system (224, FIG. 2), and fired only at a certain, predetermined wave height to reduce or eliminate time-shift errors. Further, according to some methods, the firing of the air-gun (106, FIG. 2) may be synchronized with downhole seismic receiver recording according to UTC time or another time standard. Indexing the data according to a time standard facilitates pre-sorting of the data for processing. Indexing the source performance and the receivers' recording according to a time standard also permits these data to be combined in the same dataset or file, thereby facilitating review, reporting, or data processing. Statistical quality control (QC) analysis of surface source performance and the borehole receiver (103, FIG. 2) performance may then be combined. In some cases, firing of the air-gun (106, FIG. 2) may also be synchronized with surface seismic receiver recording. Accordingly, statistical quality control (QC) analysis could then be performed for the synchronized data set, including surface source signal, signals received by surface receivers, and signals received by borehole receivers.

According to some methods, a correction is made for source signature variations. Source signature variations may result, for example, from firing pressure air changes, temperature changes, rough seas, or tidal variations. The correction may include calibrating a near field sensor signal received by the hydrophone (210, FIG. 2) located at the air-gun (106, FIG. 2) or other seismic source, according to the fixed geometry of the air-gun (106, FIG. 2) to the hydrophone (210, FIG. 2). The hydrophone (210, FIG. 2) may be part of the in-sea sensor package discussed above. The correction may further include reconstructing the far field signature of the air-gun (106, FIG. 2) or other source from measured near field signature, and maintaining true amplitude for surface seismic calibrations, AVO (amplitude variations with offset) surveys, and time-lapse surveys. In addition, corrections of the source signature may be made by comparing measured source signatures to a reference source signature, where the reference source signature is based on a seismic source reference far field signature on file at the well site.

The preceding description has been presented only to illustrate and describe the invention and some examples of its implementation. It is not intended to be exhaustive or to limit the invention to any precise form disclosed. Many modifications and variations are possible in light of the above teaching.

The preferred aspects were chosen and described in order to best explain the principles of the invention and its practical application. The preceding description is intended to enable others skilled in the art to best utilize the invention in various embodiments and aspects and with various modifications as are suited to the particular use contemplated. It is intended that the scope of the invention be defined by the following claims.

What is claimed is:

1. A source control system for borehole seismic surveys comprising:
 a seismic source;
 at least one receiver deployed in a borehole and configured to receive seismic waves generated by the seismic source;
 a handling system configured to deploy the seismic source at a predetermined location relative to the borehole receiver; and
 an in-sea source controller configured to fire the seismic source when at a predetermined height relative to borehole receivers based on variations in height due to marine conditions,
 wherein the in-sea source controller is configured to fire the seismic source only at the predetermined height relative to subsea borehole receivers.

2. The system of claim 1, further comprising a global positioning system (GPS).

3. The system of claim 1, further comprising a float attached above the seismic source and in-sea source controller, wherein the float comprises a motion sensor for detecting changes in height due to waves or variations in tide.

4. The system of claim 3, wherein the motion sensor comprises a global positioning system.

5. The system of claim 4, further comprising a switch controllable by the in-sea source controller to trigger firing of the seismic source at a predetermined wave height.

6. The system of claim 1, wherein the seismic source comprises an air-gun array.

7. The system of claim 6, further comprising an air compressor operatively connected to the air-gun array via an umbilical.

8. The system of claim 1, further comprising one or more in-sea sensors having a fixed geometry relative to the seismic source.

9. The system of claim 8, wherein the one or more in-sea sensors further comprises a digital calibrated hydrophone.

10. The system of claim 8, wherein analog signals generated by the in-sea sensors are digitized at the seismic source for relay to a processor.

11. The system of claim 8, wherein the one or more rnd.-sea sensors further comprises a depth sensor.

12. The system of claim 8, wherein the one or more in-sea sensors further comprises a firing pressure sensor.

13. The system of claim 1, further comprising an umbilical comprising digital communication lines, but no analog communication lines.

14. A survey system comprising:
a plurality of receivers deployed in a borehole;
a seismic source cluster at a sea surface at a predetermined location relative to the borehole receivers;
a handling system;
an umbilical; and
an in-sea source controller configured to repeatedly fire individual sources of the seismic source cluster when at a same predetermined height relative to the borehole receivers, based on variations in height due to marine conditions, for multiple source activations,
wherein the system is configured to detect changes in height of the seismic source cluster relative to the borehole receivers, and
the in-sea source controller is further configured to repeatedly fire individual sources of the seismic source cluster when the detected height of the seismic source cluster relative to the borehole receivers is the same as the predetermined height.

15. The system of claim 14, further comprising a GPS unit operatively connected to the in-sea source controller.

16. The system of claim 15, wherein the GPS unit is attached to a float for supporting the seismic source and in-sea source controller.

17. The system of claim 15, wherein the GPS unit registers a time standard and wherein the plurality of receivers and the seismic source are synchronized based on the time standard.

18. The system of claim 17, wherein the time standard is UTC.

19. The system of claim 14, further comprising a plurality of in-sea sensors.

20. The system of claim 19, wherein the plurality of in-sea sensors comprise one or more of: a calibrated hydrophone, a depth sensor, and a firing pressure sensor.

21. The system of claim 14, wherein the seismic source comprises an air-gun array.

22. The system of claim 21, wherein the air-gun array is staggered.

23. The system of claim 14, wherein the umbilical comprises digital communication lines.

24. The system of claim 14, further comprising a float, wherein the float includes a motion sensor configured to detect changes in height of the seismic source cluster relative to the borehole receivers due to waves or variations in tide.

25. The system of claim 24, further comprising a switch controlled by the source controller to trigger firing of the seismic source at a predetermined wave height.

26. The system of claim 14, wherein the handling system comprises a crane.

27. A method of using a source control system comprising:
deploying a seismic source;
configuring at least one receiver deployed in a borehole to receive seismic waves generated by the seismic source;
configuring a handling system to deploy the seismic source at a predetermined location relative to the borehole receiver; and
configuring an in-sea source controller to fire the seismic source when at a predetermined height relative to borehole receivers based on variations in height due to marine conditions,
wherein the in-sea source controller is configured to fire The seismic source only at the predetermined height relative to subsea borehole receivers.

28. The method of claim 27, further comprising automatically tuning the seismic source.

29. The method of claim 28, wherein the automatically tuning further comprises aligning a bubble oscillation of individual seismic sources.

30. The method of claim 28, wherein the automatically tuning further comprises aligning first pressure peaks of individual seismic sources.

31. The method of claim 27, wherein the seismic waves received by the borehole receivers are used to generate a VSP.

32. The method of claim 27, further comprising:
measuring a seismic source firing pressure directly at the seismic source; and
measuring a seismic source depth in water directly at the seismic source.

33. The method of claim 27, further comprising synchronizing the seismic source firing with borehole seismic receiver recording via a global position system.

34. The method of claim 33, further comprising synchronizing surface seismic receiver recording with the seismic source firing and borehole seismic receiver recording.

35. The method of claim 34, further comprising combining statistical quality control analysis of surface source performance with borehole receiver performance.

36. The method of claim 27, further comprising correcting for source signature variations.

37. The method of claim 36, wherein the correcting further comprises calibrating a near field sensor signal based on a fixed geometry between the seismic source and near field sensor.

38. The method of claim 37, wherein the correcting further comprises reconstructing a far field signature of the seismic source from a measured near field signature.

39. The method of claim 36, wherein the correcting further comprises maintaining a true amplitude for surface seismic calibrations, AVO surveys, and time lapse surveys.

40. The method of claim 36, wherein the correcting further comprises calibrating a near field sensor signal based on a fixed geometry between the seismic source and near field sensor;
reconstructing a far field signature of the seismic source from a measured near field signature; and maintaining a true amplitude for surface seismic calibrations, AVO surveys, and time lapse surveys.

41. The method of claim 27, wherein the seismic source comprises an air-gun array.

42. The method of claim 32, further comprising comparing the seismic source depth in water to a predetermined level.

43. The method of claim 42, further comprising disabling the firing of the seismic source if the seismic source depth is less than the predetermined level.

44. A method of improving a VSP survey comprising:
deploying a plurality of receivers in a borehole;
deploying a seismic source cluster at a sea surface at a predetermined location relative to the borehole receivers;
deploying a handling system;
deploying an umbilical;
configuring an in-sea source controller to repeatedly fire individual sources of the seismic source cluster when at a same predetermined height relative to the borehole receivers, based on variations in height due to marine conditions, for multiple source activations; and
detecting changes in height of the seismic source cluster relative to the borehole receivers to repeatedly fire individual sources of the seismic source cluster when the detected height of the seismic source cluster relative to the borehole receivers is the same as the predetermined height.

45. The method of claim 44, further comprising synchronizing seismic source firing, downhole seismic receiver recording, and surface seismic receiver recording with a time standard.

46. The method of claim 45, further comprising combining statistical quality control analysis of surface source performance with borehole receiver performance.

47. The method of claim 44, further comprising correcting for seismic source signature variations.

48. The method of claim 45, further comprising correcting for seismic source signature variations.

49. The method of claim 44, wherein the seismic source is an air-gun array.

50. The method of claim 49, comprising sequentially firing the air-gun array.

51. The method of claim 47, wherein the correcting further comprises calibrating a near field sensor signal based on fixed geometry between the seismic source and a local sensor.

52. The method of claim 47, wherein the correcting further comprises reconstructing a far field signature of the seismic source from a measured near field signature.

53. The method of claim 52, further comprising maintaining a true amplitude for surface seismic calibration.

54. The method of claim 51, further comprising comparing measured source signatures to a reference source signature, wherein the reference source signature is based on a seismic source reference far field signature on file at a well site.

55. The method of claim 44, wherein the repeatedly firing of the seismic source comprises taking GPS measurements.

56. The method of claim 44, wherein the repeatedly firing of the seismic source comprises taking measurements from a motion sensor for detecting changes in height of the seismic source cluster relative to the borehole receivers due to waves or variations in tide.

57. The method of claim 44, further comprising comparing the detected height of the seismic source cluster relative to the borehole receiver to the predetermined height and repeatedly firing individual sources of the seismic source cluster only when the detected height is the same as the predetermined height.

58. The method of claim 44, further comprising disabling the firing of the seismic source cluster if the detected height of the seismic source cluster relative to the borehole receivers is less than the predetermined height.

59. A source control system for borehole seismic surveys comprising:
at least one receiver deployed in a borehole;
a seismic source;
a handling system configured to deploy the seismic source at a predetermined location relative to the borehole receiver;
an umbilical; and
an in-sea source controller configured to synchronize the firing of the seismic source with borehole receiver recording,
the system being configured to repeatedly fire the seismic source at the same predetermined firing height relative to the borehole receiver, based on variations in height due to marine conditions, for multiple source activations,
the system being further configured to detect changes in height of The seismic source relative to the borehole receiver and to repeatedly fire The source when the detected height of the seismic source relative to the borehole receiver is the same as the predetermined height.

60. The system of claim 59, further comprising a GPS time synchronization unit.

61. The system of claim 59, further comprising a sensor configured to detect changes in height of the seismic source relative to borehole receivers to compensate for variations in marine conditions, wherein the sensor comprises a bathymetry sensor.

62. A survey system comprising:
a plurality of receivers deployed in a borehole;
a seismic source at a sea surface;
a handling system;
an umbilical;
an in-sea source controller configured to control the firing of the seismic source; and
a synchronization unit operatively connected to the in-sea source controller and configured to synchronize recording of the plurality of receivers in the borehole and firing of the seismic source,
the system being configured to repeatedly fire the seismic source at a same predetermined firing height relative to the borehole receivers, based on variations in height due to marine conditions, for multiple activations of the seismic source to compensate for variations in marine conditions,
the system being further configured to detect changes in height of the seismic source relative to the borehole receivers and to repeatedly fire the source when the detected height of the seismic source relative to the borehole receivers is the same as the predetermined firing height.

63. The system of claim 62, further comprising a GPS sensor in communication with the source controller.

64. The system of claim 63, wherein the GPS unit is attached to a float the float being arranged for supporting the seismic source and in-sea source controller.

65. The system of claim 63, wherein the GPS unit registers a time standard and wherein the plurality of receivers and the seismic source are synchronized based on the time standard.

66. The system of claim 65, wherein the time standard is UTC.

67. A source control system for borehole seismic surveys comprising:
- an underwater seismic source;
- at least one receiver deployed in a subsea borehole and configured to receive seismic waves generated by the underwater seismic source;
- a stationary handling system configured to deploy the underwater seismic source;
- an in-sea source controller programmed to fire the underwater seismic source at a predetermined water height relative to borehole receivers,
- the system being configured to repeatedly fire the seismic source at the same predetermined water height, based on variations in height due to marine conditions, for multiple activations of the seismic source,
- the system being further configured to detect changes in height of the seismic source relative to the borehole receiver and to repeatedly fire the source when the detected height of the seismic source relative to the borehole receivers is the same as the predetermined water height.

68. The system of claim 67, further comprising a vertical height sensor configured to detect changes in water height of the seismic source relative to borehole receivers and operatively connected to the underwater seismic source.

69. A source control system for borehole seismic surveys comprising:
- an underwater seismic source;
- at least one receiver deployed in a subsea borehole and configured to receive seismic waves generated by the underwater seismic source;
- a handling system configured to deploy the seismic source; and
- an in-sea source controller configured to repeatedly fire the underwater seismic source at a same predetermined height relative to the at least one borehole receiver, based on variations in height due to marine conditions, for multiple activations of the seismic source,
- the system being configured to detect changes in height of the seismic source relative to the borehole receiver and to repeatedly fire the source when the detected height of the seismic source relative to the borehole receiver is the same as the predetermined height.

* * * * *